US010009919B2

(12) United States Patent
Moulsley et al.

(10) Patent No.: US 10,009,919 B2
(45) Date of Patent: *Jun. 26, 2018

(54) CONTROL CHANNEL FOR WIRELESS COMMUNICATION

(71) Applicant: FUJITSU LIMITED, Kawasaki-shi, Kanagawa (JP)

(72) Inventors: Timothy Moulsley, Caterham Surrey (GB); Milos Tesanovic, Harrow (GB)

(73) Assignee: Fujitsu Limited, Kawasaki (JP)

( * ) Notice: Subject to any disclaimer, the term of this patent is extended or adjusted under 35 U.S.C. 154(b) by 119 days.

This patent is subject to a terminal disclaimer.

(21) Appl. No.: 15/153,409

(22) Filed: May 12, 2016

(65) Prior Publication Data

US 2016/0262176 A1 Sep. 8, 2016

Related U.S. Application Data

(63) Continuation of application No. 14/136,212, filed on Dec. 20, 2013, now Pat. No. 9,357,541, which is a
(Continued)

(51) Int. Cl.
*H04B 7/00* (2006.01)
*H04W 72/12* (2009.01)
(Continued)

(52) U.S. Cl.
CPC ....... *H04W 72/1289* (2013.01); *H04L 5/0007* (2013.01); *H04L 27/2614* (2013.01);
(Continued)

(58) Field of Classification Search
CPC ............... H04W 72/042; H04W 4/005; H04W 72/1289; H04W 28/18
(Continued)

(56) References Cited

U.S. PATENT DOCUMENTS 8,744,458 B2 6/2014 Hakola et al.
2008/0031191 A1 2/2008 Kashima et al.
(Continued)

FOREIGN PATENT DOCUMENTS

CN 101388748 A 3/2009
CN 101404815 A 4/2009
(Continued)

OTHER PUBLICATIONS

International Search Report issued for corresponding International Patent Application No. PCT/EP2011/069444, dated Apr. 27, 2012.
(Continued)

*Primary Examiner* — Dmitry H Levitan
(74) *Attorney, Agent, or Firm* — Myers Wolin, LLC.

(57) ABSTRACT

A terminal apparatus performs transmission and/or reception in units of subframes, and receives the control signal arranged in accordance with a predefined format having a predetermined size in bits and comprising one or more sets of bits each containing one or more bits from a base station; wherein within the format, a first set of bits is intended for one or more terminal apparatus and a second set of bits distinct from the first set of bits is intended for other terminal apparatus; and wherein transmission and/or reception by the terminal apparatus in a subsequent subframe is determined by the said set of bits of the control signal.

8 Claims, 4 Drawing Sheets

Related U.S. Application Data continuation of application No. PCT/EP2011/069444, filed on Nov. 4, 2011, which is a continuation of application No. PCT/EP2011/063164, filed on Jul. 29, 2011.

(51) Int. Cl.
*H04W 72/04* (2009.01)
*H04L 27/26* (2006.01)
*H04W 4/70* (2018.01)
*H04W 28/18* (2009.01)
*H04L 5/00* (2006.01)

(52) U.S. Cl.
CPC ............ *H04W 4/70* (2018.02); *H04W 72/042* (2013.01); *H04W 72/0446* (2013.01); *H04W 72/1284* (2013.01); *H04L 5/003* (2013.01); *H04W 28/18* (2013.01)

(58) Field of Classification Search
USPC ........................ 370/310, 328, 329, 431, 465
See application file for complete search history.

(56) References Cited

U.S. PATENT DOCUMENTS

| | | |
|---|---|---|
| 2009/0279500 A1 | 11/2009 | Luo et al. |
| 2010/0272019 A1 | 10/2010 | Papasakellariou et al. |
| 2010/0323709 A1 | 12/2010 | Nam et al. |

FOREIGN PATENT DOCUMENTS

| | | |
|---|---|---|
| CN | 101982001 A | 2/2011 |
| EP | 2306661 | 4/2011 |
| WO | 2009/121025 | 10/2009 |
| WO | 2011/100326 | 8/2011 |

OTHER PUBLICATIONS

ETSI TS 136 213 V8.3.0; LTE; Evolved Universal Terrestrial Radio Access (E-UTRA); "Physical layer procedures (3GPP TS 36.213 version 8.3.0 Release 8)"; Nov. 2008.

ETSI TS 136 212 V8.8.0; LTE; Evolved Universal Terrestrial Radio Access (E-UTRA); "Multiplexing and channel coding (3GPP TS 36.212 version 8.8.0 Release 8)"; Jan. 2010.

3GPP TS 36.216 V10.0.0; 3rd Generation Partnership Project; Technical Specification Group Radio Access Network; Evolved Universal Terrestrial Radio Access (E-UTRA); "Physical layer for relaying operation (Release 10)"; Sep. 2010.

Notice of Preliminary Rejection issued for corresponding Korean Patent Application No. 10-2014-7000394 dated May 27, 2015 with an English translation.

Non-Final Office Action issued by the USPTO for corresponding U.S. Appl. No. 14/136,212, dated Jul. 24, 2015.

First Notification of Office Action issued by the State Intellectual Property Office of China for corresponding Chinese Patent Application No. 201180072604.1, dated Aug. 29, 2016, with an English translation.

CONTROL CHANNEL FOR WIRELESS COMMUNICATION

CROSS-REFERENCE TO RELATED APPLICATIONS

This application is a continuation of U.S. application Ser. No. 14/136,212, filed on Dec. 20, 2013, which is a continuation of international Application No. PCT/EP2011/069444, filed Nov. 4, 2011, which claims priority from International Application No. PCT/EP2011/063164, filed Jul. 29, 2011, the contents of each are herein wholly incorporated by reference.

FIELD OF THE INVENTION

The present invention relates to wireless communication systems, for example systems based on the 3GPP Long Term Evolution (LTE) and 3GPP LTE-A groups of standards.

BACKGROUND OF THE INVENTION

Wireless communication systems are widely known in which base stations (BSs) form "cells" and communicate with user equipments (UEs) (also called subscriber or mobile stations) within range of the BSs.

In such a system, each BS divides its available bandwidth, i.e. frequency and time resources in a given cell, into individual resource allocations for the user equipments which it serves. The user equipments are generally mobile and therefore may move among the cells, prompting a need for handovers of radio communication links between the base stations of adjacent cells. A user equipment may be in range of (i.e. able to detect signals from) several cells at the same time, but in the simplest case it communicates with one "serving" or "primary" cell.

Modern wireless communication systems such as LTE and LTE-A are hugely complex and a full description of their operation is beyond the scope of this specification. However, for assisting understanding of the inventive concepts to be described later, some outline will be given of some of the features of LTE which are of particular relevance in the present invention.

Basic LTE Network Topology

The network topology in LTE is illustrated in FIG. 1. As can be seen, each UE 12 connects over a wireless link via a Uu interface to an eNB 11, and the network of eNBs is referred to as the eUTRAN 10.

Each eNB 11 in turn is connected by a (usually) wired link using an interface called S1 to higher-level or "core network" entities, including a Serving Gateway (S-GW 22), and a Mobility Management Entity (MME 21) for managing the system and sending control signalling to other nodes, particularly eNBs, in the network. In addition, a PDN or Packet Data Network Gateway (P-GW) is present, separately or combined with the S-GW 22, to exchange data packets with any packet data network including the Internet. The core network 20 is called the EPC or Evolved Packet Core.

Machine Type Communication (MTC) and Machine-to-Machine (M2M) Communication

Machine-to-Machine (M2M) communication, usually referred to in the context of LTE as Machine Type Communication (MTC), is a form of data communication which involves one or more entities that do not necessarily need human interaction; in other words the 'users' may be machines.

MTC is different from current communication models as it potentially involves very large number of communicating entities (MTC devices) with little traffic per device. Examples of such applications include: fleet management, smart metering, product tracking, home automation, e-health, etc.

MTC has great potential for being carried on wireless communication systems (also referred to here as mobile networks), owing to their ubiquitous coverage. However, for mobile networks to be competitive for mass machine-type applications, it is important to optimise their support for MTC. Current mobile networks are optimally designed for Human-to-Human communications, but are less optimal for machine-to-machine, machine-to-human, or human-to-machine applications. It is also important to enable network operators to offer MTC services at a low cost level, to match the expectations of mass-market machine-type services and applications.

To fully support these service requirements, it is necessary to improve the ability of mobile networks to handle machine-type communications.

In the LTE network illustrated in FIG. 2, a group of MTC devices 200 is served by an eNB 11 which also maintains connections with normal UEs 12. The eNB receives signalling from the MME 21 and data (for example, a request for a status report from a supervisor of the MTC devices) via the S-GW 22.

Thus, there is a MTCu interface analogous to the Uu interface, and the MTC devices will be served in a similar way to normal user equipments by the mobile networks. When a large number of MTC devices connect to the same cell of a UMTS RNS or an LTE eNB, each of the devices will need resources to be allocated to support the individual devices' applications even though each MTC device may have little data.

In the remainder of this specification, the term "UE" includes "MTC device" unless otherwise demanded by the context.

For assisting understanding of the inventive concepts to be described later, some outline will be given of some specific aspects or features of LTE which are of particular relevance in the present invention.

OFDMA and SC-FDMA

In the downlink of an LTE system, in other words the direction of transmission from the base station (eNB) towards the user equipments (UEs), individual OFDM subcarriers or sets of subcarriers are assigned to different user equipments. The result is a multi-access system referred to as OFDMA (Orthogonal Frequency Division Multiple Access). By assigning distinct frequency/time resources to each user equipment in a cell, OFDMA can substantially avoid interference among the users served within a given cell.

The UEs are allocated a specific number of subcarriers for a predetermined amount of time. An amount of resource consisting of a set number of subcarriers and OFDM symbols is referred to as a resource block (RB) in LTE. RBs thus have both a time and frequency dimension. Allocation of RBs is handled by a scheduling function at the eNB.

The uplink in an LTE wireless communication system employs a variant of OFDMA called Single-Carrier FDMA (SC-FDMA). Essentially, SC-FDMA is a linearly precoded OFDMA scheme, involving an additional DFT step before the conventional OFDMA processing. Access to the uplink by multiple UEs is enabled by assigning to each UE a distinct set of non-overlapping sub-carriers. This allows a single-carrier transmit signal, reducing the peak-to-average power ratio (PAPR) in comparison with OFDMA.

Frame Structure and Resource Blocks

In a wireless communication system such as LTE, data for transmission on the downlink is organised in OFDMA frames each divided into a number of sub-frames. Various frame types are possible and differ between frequency division duplex (FDD) and time division duplex (TDD) for example.

FIG. 3 shows a generic frame structure for LTE, applicable to the downlink, in which the 10 ms frame is divided into 20 equally sized slots of 0.5 ms. A sub-frame SF consists of two consecutive slots, so one radio frame contains 10 sub-frames.

The transmitted signal in each slot is described by a resource grid of sub-carriers and available OFDM symbols, as shown in FIG. 4. Each element in the resource grid is called a resource element (RE) and each resource element corresponds to one symbol.

For each transmission time interval of 1 ms, a new scheduling decision is taken regarding which UEs are assigned to which time/frequency resources during this transmission time interval, the scheduling being made in units of resource blocks (RB). As shown in FIG. 4, one resource block is usually defined as 7 consecutive OFDM symbols in the time domain and 12 consecutive sub-carriers in the frequency domain. Several resource blocks may be allocated to the same UE, and these resource blocks do not have to be contiguous with each other. Scheduling decisions are taken at the eNB, using a scheduling algorithm which takes into account the radio link quality situation of different UEs, the overall interference situation, Quality of Service requirements, service priorities, etc.

Channels

In LTE, several channels for data and control signalling are defined at various levels of abstraction within the system. FIG. 5 shows some of the channels defined in LTE at each of a logical level, transport layer level and physical layer level, and the mappings between them. For present purposes, the channels at the physical layer level are of most interest.

On the downlink, user data is carried on the Physical Downlink Shared Channel (PDSCH). There are various control channels on the downlink, which carry signalling for various purposes including so-called Radio Resource Control (RRC), a protocol used as part of radio resource management, RRM. In particular this signalling comprises the Physical Downlink Control Channel, PDCCH (see below).

Meanwhile, on the uplink, user data and also some signalling data is carried on the Physical Uplink Shared Channel (PUSCH). By means of frequency hopping on PUSCH, frequency diversity effects can be exploited and interference averaged out. The control channels include a Physical Uplink Control Channel, PUCCH, used to carry signalling from UEs including channel state information (CSI), as represented for example by channel quality indication (CQI) reports, and scheduling requests.

PDCCH and DCI

In LTE, both the DL and UL are fully scheduled since the DL and UL traffic channels are dynamically shared channels. This means that PDCCH must provide scheduling information to indicate which users should decode the physical DL shared channel (PDSCH) in each sub-frame and which users are allowed to transmit on the physical UL shared channel (PUSCH) in each sub-frame. PDCCH is used to carry scheduling information—called downlink control information, DCI—from base stations (called eNBs in LTE) to individual UEs. Conventionally, one PDCCH message contains one DCI format. This is often intended for one individual UE, but some messages are also broadcast (e.g. intended for multiple UEs within a cell). Thus PDCCH can also contain information intended for a group of UEs, such as Transmit Power Control (TPC) commands. In addition the PDCCH can be used to configure a semi-persistent schedule (SPS), where the same resources are available on a periodic basis. The motivation for SPS is to support applications.

PDCCH is transmitted on an aggregation of one or several consecutive control channel elements (CCEs), where a control channel element corresponds to 9 resource element groups (REG). Each REG in turn occupies four of the Resource Elements (REs) shown in FIG. 4.

More particularly PDCCH contains:

the resource allocations for the downlink transport channel DL-SCH

Transmit Power Control (TPC) commands for PUCCH and the uplink transport channel UL-SCH; these commands enable the UE to adjust its transmit power to save battery usage Hybrid-Automatic Repeat Request (HARQ) setup information MIMO (see below) precoding information.

A cyclic redundancy check (CRC) is used for error detection of the DCI. The entire PDCCH payload is used to calculate a set of CRC parity bits, which are then appended to the end of the PDCCH payload.

As multiple PDCCHs relevant to different UEs can be present in one sub-frame, the CRC is also used to specify which UE a PDCCH is relevant to. This is done by scrambling the CRC parity bits with a Radio Network Temporary Identifier (RNTI) of the UE. Various kinds or RNTI are defined, as explained in more detail below.

The size of the DCI depends on a number of factors, and thus it is necessary that the UE is aware of the size of the DCI, either by RRC configuration or by another means to signal the number of symbols occupied by PDCCH.

Depending on the purpose of the DCI message, different DCI formats are defined. The DCI formats include:

Format 0 for transmission of uplink shared channel (UL-SCH) allocation

Format 1 for transmission of DL-SCH allocation for Single Input Multiple Output (SIMO) operation Format 1A for compact transmission of DL-SCH allocation for SIMO operation or allocating a dedicated preamble signature to a UE for random access Format 3 and format 3A for transmission of TPC command for an uplink channel.

DCI Formats 3 and 3A carry multiple power control bits representing multiple power control commands, each power control command being intended for a different UE. The main application of interest for Formats 3 and 3A is to support SPS in the uplink (since UE specific PDCCH DCI formats to carry power control commands are not then required).

Further details of the full set of DCI formats already defined in LTE can be found In the document 3GPP TS36.212 "Evolved Universal Terrestrial Radio Access (E-UTRA): Multiplexing and channel coding", hereby incorporated by reference. As an example, format 0 is specified as follows:

| DCI Format | fields | size | description |
|---|---|---|---|
| 'Format0' | DCI Format | — | 'Format0': indicates the DCI format to the UE |
| | AllocationType | 1-bit | Resource allocation header: type0, type1 (for uplink frequency hopping) |
| | Allocation | variable | Resource block assignment/ allocation: indicates the starting RB as well as the number of contiguous RBs allocated to the UE |
| | HoppingFlag | 1-bit | PUSCH hopping flag (for uplink frequency hopping) |
| | ModCoding | 5-bits | Modulation, coding scheme and redundancy version |
| | NewData | 1-bit | New data indicator (a new transmission is to be sent) |
| | TPC | 2-bits | PUSCH TPC command for adapting the UE's transmit power |
| | CShiftDMRS | 3-bits | Cyclic shift for an uplink demodulation reference signal DM RS |
| | CQIReq | 1-bit | CQI request: requests UE to send a channel quality indication |
| | DAI | 2-bits | Downlink assignment index (TDD only) |
| | ULIndex | 2-bits | UL index (TDD only) |

Since, as already mentioned, multiple UEs can be scheduled within the same sub-frame, conventionally therefore multiple DCI messages are sent using multiple PDCCHs.

The format to be used depends on the purpose of the control message. For example, DCI format 1 is used for the assignment of a downlink shared channel resource when no spatial multiplexing is used (i.e. the scheduling information is provided for one code word transmitted using one spatial layer only). The information provided enables the UE to identify the resources, where to receive the PDSCH in that sub-frame, and how to decode it. Besides the resource block assignment, this also includes information on the modulation and coding scheme and on the hybrid ARQ protocol used to manage retransmission of non-received data.

A UE needs to check all possible combinations of PDCCH locations, PDCCH formats, and DCI formats and act on those message with correct CRCs (taking into account that the CRC is scrambled with a RNTI). To reduce the required amount of 'blind decoding' of all the possible combinations, for each UE a limited set of CCE locations is defined where a PDCCH may be placed. The set of CCE locations in which the UE may find its PDCCH is called the "search space". In LTE, separate UE-specific and common search spaces are defined, where a dedicated search space is configured for each UE individually, while all UEs are informed of the extent of the common search space.

RNTIs

RNTIs or Radio Network Temporary Identifiers, mentioned earlier, are used by the eNB to scramble the CRC applied to the PDCCH payload. Types of RNTI currently defined in LTE include the following.

P-RNTI (Paging RNTI):

To receive paging messages from E-UTRAN, UEs in an idle mode monitor the PDCCH channel for a P-RNTI value used to indicate paging. If the terminal detects a group identity used for paging (the P-RNTI) when it wakes up, it will process the corresponding downlink paging message transmitted on the PCH.

SI-RNTI (System Information RNTI):

The presence of system information on DL-SCH in a sub-frame is indicated by the transmission of a corresponding PDCCH marked with a special System Information RNTI (SI-RNTI). This PDCCH message indicates the transport format and physical resources (set of resource blocks) allocated for system-information transmission.

M-RNTI (MBMS RNTI):

This is used in Multimedia Broadcast Multicast Services (MBMS), a point-to-multipoint transmission scheme available in LTE.

RA-RNTI (Random Access RNTI):

The RA-RNTI is used on the PDCCH when Random Access Response (RAR) messages are transmitted, to identify which time-frequency resource was utilized by the UE to transmit a Random Access preamble. In the event of a collision when multiple UEs select the same signature in the same preamble time-frequency resource, they each receive the RAR message.

C-RNTI (Cell RNTI):

The C-RNTI is used by a given UE while it is in a particular cell, after it has successfully joined the network by performing a network entry process with the eNB of that cell. The C-RNTI is used for normal scheduling of downlink resources for the UE, also called dynamic scheduling as opposed to semi-persistent scheduling (see below).

TC-RNTI:

If a UE does not have an allocated C-RNTI, then a Temporary C-RNTI (TC-RNTI) is used for further communication between the terminal and the network. Once the UE has completed the network entry process, the TC-RNTI is changed to a C-RNTI.

SPS-C-RNTI (Semi-Persistent Scheduling C-RNTI):

This form of RNTI is used in SPS (see below). For the configuration or reconfiguration of a persistent schedule, RRC signalling indicates the resource allocation interval at which the radio resources are periodically assigned to a specific UE. Specific transmission resource allocations in the frequency domain, and transmission attributes such as the modulation and coding scheme, are signalled using the PDCCH. The actual transmission timing of the PDCCH messages is used as the reference timing to which the resource allocation interval applies. When the PDCCH is used to configure or reconfigure a persistent schedule, it is necessary to distinguish the scheduling messages which apply to a persistent schedule from those used for dynamic scheduling. For this purpose, a special identity is used, known as the Semi-Persistent Scheduling C-RNTI (SPS-C-RNTI), which for each UE is different from the C-RNTI used for dynamic scheduling messages.

TPC-PUCCH-RNTI (Transmit Power Control-Physical Uplink Control Channel-RNTI) and TPC-PUSCH-RNTI (Transmit Power Control-Physical Uplink Shared Channel-RNTI):

The power-control message is directed to a group of terminals using an RNTI specific for that group. Each terminal can be allocated two power-control RNTIs, one for PUCCH power control and the other for PUSCH power control. Although the power control RNTIs are common to a group of terminals, each terminal is informed through RRC signaling which bit(s) in the DCI message it should follow.

Further details of RNTIs available in LTE are given by the document 3GPP TS 36.213: "Evolved Universal Terrestrial Radio Access (E-UTRA); Physical layer procedures", hereby incorporated by reference.

SPS

Semi-Persistent Scheduling, SPS, schedules resources for UEs on an ongoing basis and thereby reduces control channel overhead for applications that require persistent radio resource allocations such as VoIP (Voice over Internet Protocol). In LTE, both the DL and UL are fully scheduled as already mentioned so that without SPS, every DL or UL physical resource block (PRB) allocation must be granted via a PDCCH message. Note that although retransmissions on PUSCH can be made autonomously without an explicit UL grant, the first transmission would require a grant. This works well with large packet sizes and only a few users to be scheduled each sub-frame. However, for applications that require persistent allocations of small packets, the control channel overhead due to scheduling information can be greatly reduced with SPS. In SPS, the eNB defines a persistent resource allocation that a user should expect on the DL or can transmit on the UL. This can also be highly beneficial for MTC for example, where the MTC devices may be expected to transmit a small amount of data at fixed intervals.

On the other hand, SPS as currently defined has various limitations as will be explained later.

R-PDCCH

FIGS. 1 and 2 show network topologies in which UEs and/or MTC devices communicate directly with a eNB. However, it is likely that practical LTE deployments will employ relay nodes (RNs) intermediate between UEs or MTC devices and the eNB providing the cell.

A new physical control channel, called the relay physical downlink control channel (R-PDCCH), may be used to dynamically or semi-persistently assign resources, within the semi-statically assigned sub-frames, for the relay physical downlink shared channel (R-PDSCH). The R-PDCCH is also used to dynamically or semi-persistently assign resources for the relay physical uplink shared channel (R-PUSCH).

R-PDCCH may be transmitted on a subset (including up to all of) of the OFDM symbols of the sub-frames assigned for the backhaul link (PDSCH). It is transmitted starting from an OFDM symbol within the sub-frame that is late enough so that the RN can receive it. R-PDCCH may be used to assign DL resources in the same sub-frame and/or in one or more later sub-frames; it may be also be used to assign UL resources in one or more later sub-frames.

Further details of R-PDCCH can be found in the LTE standards document 3GPP TS 36.216: "Evolved Universal Terrestrial Radio Access (E-UTRA); Physical layer for relay operation", hereby incorporated by reference. In the remainder of this specification, references to PDCCH are to be understood as including R-PDCCH unless the context demands otherwise.

DRX and DTX

Discontinuous Reception (DRX) and Discontinuous Transmission (DTX) are techniques for saving power at the UE, and are also highly relevant to MTC. Both DRX and DTX involve reducing switching off the UE's transceiver periodically. Although the data throughput capacity is reduced in proportion to power saving, this is often not a problem for MTC devices having only a limited data capacity.

The eNB sets a cycle where the UE is operational for a certain period of time, during which all the scheduling and paging information is transmitted. Except in DRX mode, the UE's transceiver must be active to monitor PDCCH (to identify DL data).

Limitations of PDCCH and SPS

Currently in LTE, control channel messages (using PDCCH) may be transmitted to a UE from one or more serving cells. This control channel is typically used to indicate to the UE information about a downlink transmission that will occur on a downlink data channel (PDSCH) or to grant resources for transmission on an uplink data transmission (on PUSCH). In addition the PDCCH can be used to configure a semi-persistent schedule (SPS), where the same resources are available on a periodic basis. PDCCH can also contain information intended for a group of UEs. In particular Formats 3 and 3A carry multiple TPC bits, each intended for a particular UE. In general however, and particularly for scheduling other than SPS, a separate PDCCH is required for each UE.

A PDCCH transmission typically contains a payload of around 50 bits (including CRC), with additional channel coding to improve robustness to transmission errors. For some applications only small data packets are required, so the PDCCH payload may represent a significant overhead. This may be even more significant for some configurations of TDD, with a limited proportion of subframes allocated for DL transmission. In addition, there is a limit on the maximum number of PDCCH messages that can be transmitted at the same time (i.e. within the same subframe), which may be insufficient to support a large number of active UEs transmitting or receiving only small data packets.

One scenario where such control channel limitations may be significant is for Machine-To-Machine (M2M) Communication or Machine Type Communication (MTC). As a particular example, a sensor application may require small data packets (e.g. temperature readings) to be sent at short intervals from a large number of devices within one cell.

Meanwhile, semi-persistent scheduling (SPS) allows the resource allocation to be pre-configured. However, changing the resource allocation (including timing) of SPS for one UE requires a PDCCH message specifically for that UE.

In any case the current control channel arrangements intended for SPS suffer from a number of limitations, some of which are considered here:—
  The availability of resources for SPS is limited to particular limited set of periodicities
  The number of resource elements (REs) for SPS is fixed
  The data rate (transport block size) for SPS is fixed
  The modulation and coding scheme for SPS is fixed
  Scenarios where such control channel limitations may be significant, so that neither UE-specific PDCCH DCI formats or SPS are directly suitable, could include the following:—
  Applications requiring regular transmission of small packets but with variable size (e.g. VoIP, where the packets may have one of a small set of sizes)
  Applications requiring intermittent or irregular transmission of small packets of the same size (e.g. a sensor application sending a reading when the temperature changes)
  Applications requiring regular transmission of small packets with the same size (e.g. VoIP) but where the variations in the radio channel mean that efficient channel adaptation requires variation of the transmission rate and/or location of the resource allocation in the frequency domain
  Applications which could otherwise be supported by SPS but where the desired HARQ operating point leads to a high probability of retransmission, each retransmission requiring a PDCCH message.
  Therefore means for provision of efficient control channel functionality with low overhead for the above, for example by extending SPS functionality, is of significant interest.

SUMMARY OF THE INVENTION

According to a first aspect of the present invention, there is provided a wireless communication method in which a base station transmits a control signal, the control signal arranged in accordance with a predefined format having a predetermined size in bits and comprising one or more sets of bits each containing one or more bits;

wherein a first set of bits within the format is intended for a first terminal and a set of bits within the format is intended for a second terminal; and wherein the timing of subsequent transmission and/or reception by the first terminal is determined by the control signal.

Here, "timing" may refer either to an absolute time for the subsequent transmission/reception or to a relative time, in other words a timing offset. Time may be expressed in various ways, for example in units of subframes defined in a network to which the base station belongs. The term "timing" is thus to be construed broadly. Such a timing offset may be configured separately for each terminal. The offset may be with respect to the current subframe, being the subframe in which the control signal is received by the terminal.

In the above wireless communication method, the timing of subsequent transmission and/or reception by the first terminal may depend on the timing of reception of the control signal.

Alternatively, or in addition, the timing of subsequent transmission and/or reception by the first terminal depends on the value(s) of the first set of bits. For example, the value(s) may represent a number of subframes as a timing offset from the current subframe.

The first and second terminals may be regarded as constituting a group of terminals addressed by the control signal. There may be any number of other terminals in the group. The terminals may be addressed either collectively or individually, or a set of bits may be used to address the terminals in common, with other sets of bits intended for each specific terminal individually.

Thus, in one embodiment, a second set of bits, distinct from the first set of bits is intended for the second terminal. In another embodiment, the first set of bits is also intended for the second terminal. These embodiments may be combined. That is, in SPS for example, it may be desirable to set certain parameter values in common for a group of terminals whilst setting other parameter values individually on a per-terminal basis. This can be achieved by providing one (or more) set of bits for representing common parameter values and other sets of bits for configuring terminals individually.

A further possibility is that more than one set of bits is specifically intended for the same terminal. For example one set of bits may relate to scheduling the terminal on the uplink, and another set of bits to scheduling the same terminal on the downlink.

Preferably, the sets of bits include sets of bits representing values of one or more parameters, used to control some aspect of operation of the terminals.

Within the control signal, distinct sets of bits may represent the same parameter(s), allowing different terminals to be configured with different values for those parameters.

A particularly compact form of conveying information within the control signal is to use each set of bits to represent one of a plurality of predefined sets of parameter values. Thus, the sets of bits may include sets of bits representing a selection among predetermined sets of parameter values. In this way, a small number of bits can be used to set values of a number of different parameters simultaneously. Whilst lacking the flexibility of setting parameter values individually, this approach allows UEs to be quickly and efficiently configured with parameter values likely to be broadly suited to the channel conditions between the UE and base station.

The parameter values, or the predetermined sets of parameter values, preferably include parameter values for scheduling transmission and/or reception of the first and second terminals. However, the control signal may include parameter values for other purposes too, such as power control and/or ACK/NACK, where transmission of "NACK" may also implicitly lead to retransmission of a packet in the uplink.

In a preferred embodiment of the method, transmission and/or reception by the first terminal occurs in units of subframes and the first set of bits includes at least one bit indicating any one of:

whether transmission and/or reception is to be performed in the current subframe either on a downlink and/or on an uplink;

whether transmission and/or reception is to be performed in subsequent subframes either on a downlink and/or on an uplink;

whether transmission and/or reception is to be performed in a defined subframe which is a defined number of subframes from the current subframe;

whether semi-persistent scheduling, SPS operation is to be activated or deactivated;

a selection among predetermined sets of parameter values for scheduling; and a selection among a predetermined set of carrier frequencies for scheduling.

In the above, "scheduling" may refer to semi-persistent scheduling, SPS (or an enhanced version thereof), but is not necessarily limited to SPS. References in this specification to SPS include enhanced semi-persistent scheduling with greater operational flexibility as permitted by the present invention, in addition to conventional SPS as already provided for in the standards.

Currently in LTE, a single control channel (PDCCH) is transmitted to the UE for any UL or DL resource allocation, except for SPS, where the resource allocation is pre-configured. However, changing the resource allocation (including timing) of SPS for one UE requires a PDCCH message. The invention provides a means for re-configuring or re-allocating SPS resources for multiple UEs using a single PDCCH transmission.

A particular form of the invention is for use in an LTE-based wireless communication system in which the control signals are downlink control information, DCI, and the predefined format is a DCI format transmitted on a physical downlink control channel, PDCCH. Preferably, in this form of the invention, the predefined format has the same predetermined size in bits as another DCI format defined in LTE.

In this case, the control signals arranged in the predefined format may be transmitted within a common search space of the PDCCH transmission, or alternatively they may be transmitted within a search space of the downlink transmission which is distinct from a common search space.

As already mentioned, the first and second terminals may be regarded as a group of terminals addressed by the control signal. To allow terminals to recognise the control signal, preferably, the predefined format has an associated cyclic redundancy code, CRC, scrambled with a group radio network temporary identifier, RNTI, for enabling the first and second terminals to interpret the DCI, which is distinct from any RNTI used for other formats of DCI defined in LTE. In the specific embodiment to be described, which is applied to SPS, this RNTI is called a SPS Group C-RNTI or SPSG C-RNTI.

Various possibilities are available to reduce the amount of additional decoding required at the terminals. The first and second terminals may be preconfigured to expect to receive said predefined format only in selected subframes of downlink transmission from the base station. Alternatively the method may arrange that, when a subframe contains the control signal having the predefined format as defined above, no other DCI format is employed in the same subframe. Also, in the case of employing the control signal to configure SPS, the novel format is optionally only used in subframes already configured for SPS. Another alternative is to arrange that the UE only expects to receive a DCI format with SPSG C-RNTI in subframes where the corresponding scheduling or reconfiguration of transmission or reception would be applicable.

In one possible form of the method, the terminals communicate with the base station via at least one relay station, the relay station receiving control signals from the base station and/or transmitting control signals to the terminals using said predefined format.

The method may be a machine-to-machine, M2M, or machine type communication, MTC, method wherein the terminals are autonomous machines (e.g., MTC devices).

Embodiments of the present invention are for use in an LTE-based wireless communication system in which the control signals are downlink control information, DCI, and the format is a DCI format transmitted on a physical downlink control channel, PDCCH.

Here, "PDCCH" relates to any physical downlink control channel in LTE, including R-PDCCH (see above) or any control channel yet to be defined.

The one or more sets of parameters represented in the predefined format may be sets of parameters contained in any of the existing formats defined in LTE Release 8, 9, or 10 specifications. The values of one or more bits in said predefined format may indicate one of a set of preconfigured PDCCH messages or partial PDCCH messages. Thus, one bit in the predefined DCI format would allow one of two different messages to be indicated. Two bits would allow one of four different messages to be indicated, etc. Preferably, in this case, the predefined format provided in the present invention has the same predetermined size in bits as one or more of the existing formats defined in LTE. Here, "existing formats" means formats already specified in the LTE standards as of the priority date, including for example formats 0, 1, 1A, 3 and 3A.

In one variant of the embodiment, the control signals arranged in the predefined format are transmitted within a common search space of the PDCCH transmission. This has the advantage of minimising the additional decoding effort at the terminal.

In another variant the control signals arranged in the predefined format are transmitted within a search space of the downlink transmission which is distinct from a common search space. This has the advantage of allowing a larger number of PDCH messages to be transmitted.

According to a second aspect of the present invention, there is provided base station equipment for use in any wireless communication method as defined above, and configured to transmit control signals in accordance with said predefined format.

According to a third aspect of the present invention, there is provided user equipment for use in any wireless communication method as defined above, configured to decode control signals in accordance with the predefined format.

Further aspects of the present invention may provide a RRM entity in a wireless communication network for configuring base station equipment and user equipment for performing any of the methods as defined above. A further aspect relates to software for allowing transceiver equipment equipped with a processor to provide base station equipment or user equipment as defined above. Such software may be recorded on a computer-readable medium.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between base stations and user equipments in a wireless communication system. A base station may take any form suitable for transmitting and receiving such signals. It is envisaged that the base stations will typically take the form proposed for implementation in the 3GPP LTE and 3GPP LTE-A groups of standards, and may therefore be described as an eNB (eNB) (which term also embraces Home eNB or Home eNB) as appropriate in different situations. However, subject to the functional requirements of the invention, some or all base stations may take any other form suitable for transmitting and receiving signals from user equipments.

Similarly, in the present invention, each user equipment may take any form suitable for transmitting and receiving signals from base stations. For example, the user equipment may take the form of a subscriber station (SS), or a mobile station (MS), or any other suitable fixed-position or movable form. For the purpose of visualising the invention, it may be convenient to imagine the user equipment as a mobile handset (and in many instances at least some of the user equipments will comprise mobile handsets), however no limitation whatsoever is to be implied from this. In particular the user equipments may be MTC devices.

BRIEF DESCRIPTION OF THE DRAWINGS

Reference is made, by way of example only, to the accompanying drawings in which.

DETAILED DESCRIPTION

Figure 1:
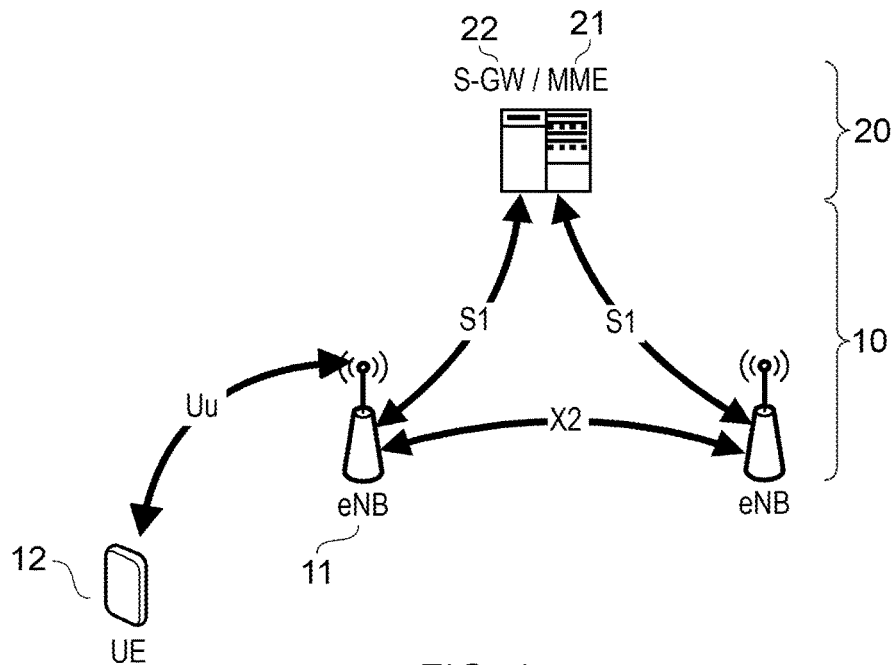
FIG. 1 schematically illustrates a basic LTE network topology.
Figure 2:
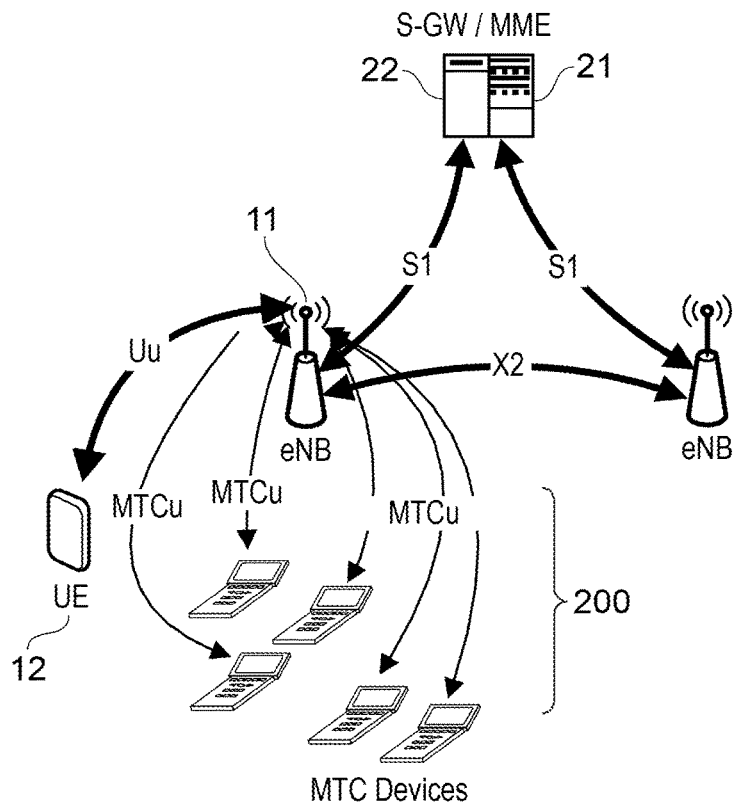
FIG. 2 schematically illustrate a network topology for a wireless communication system with MTC devices.
Figure 3:
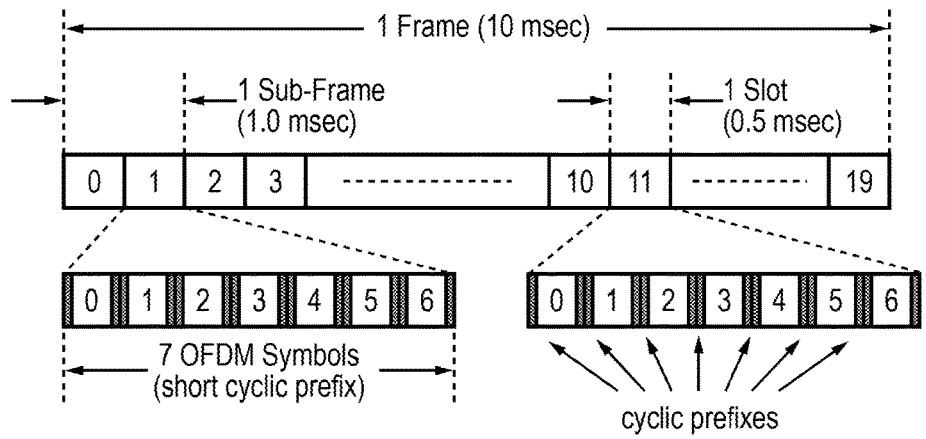
FIG. 3 illustrates a generic frame structure employed for the downlink in an LTE wireless communication system.
Figure 4:
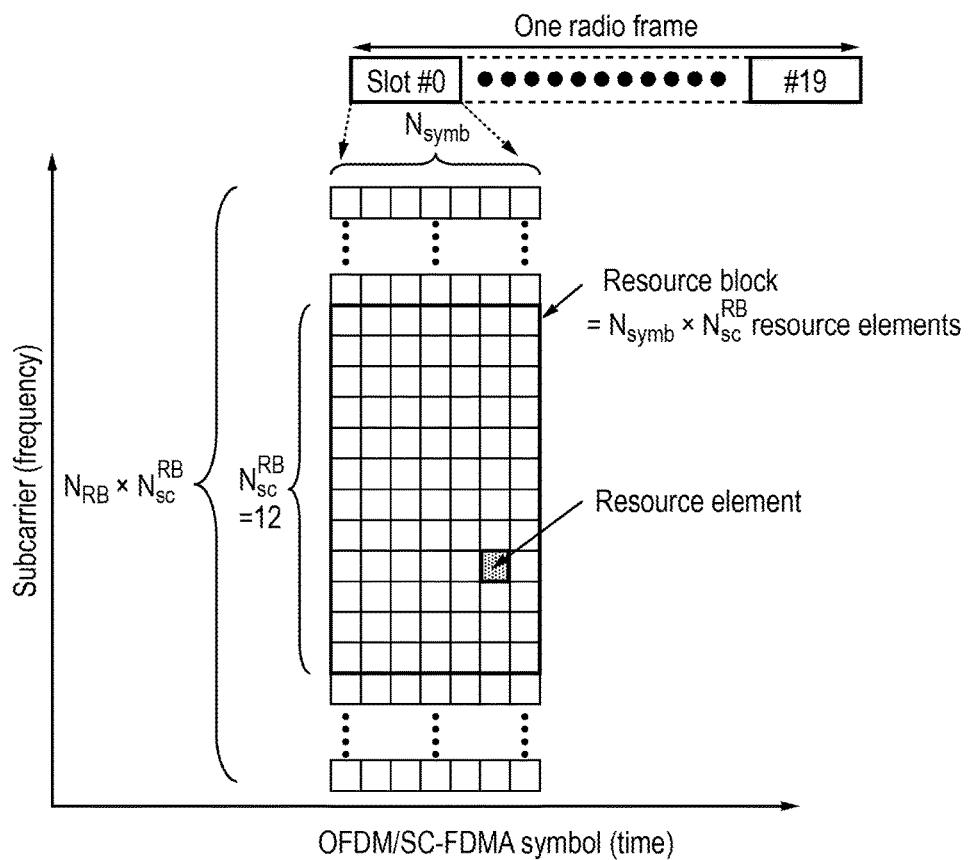
FIG. 4 illustrates resource allocation within a frame.
Figure 5:
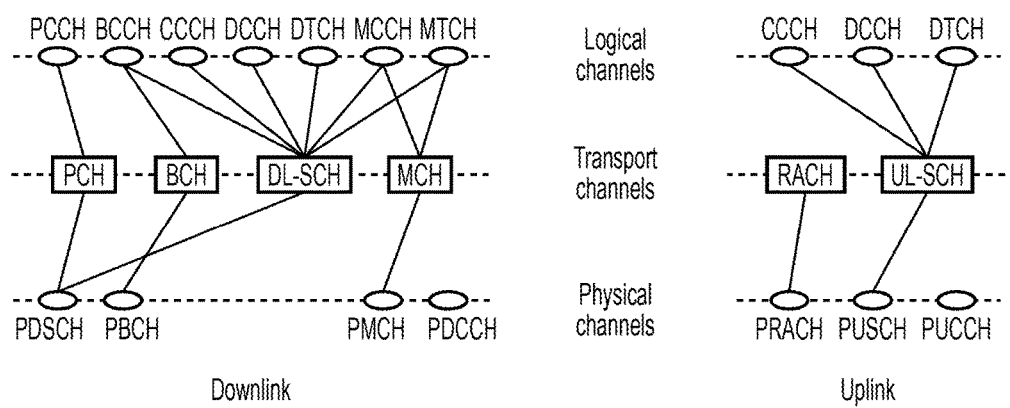
FIG. 5 shows relationships between various channels defined in LTE.

Before describing embodiments of the present invention, some further discussion will be given in relation to the control channel PDCCH in LTE. However, it is to be noted that the present invention is not restricted to application to PDCCH, or to LTE.

Following on from the discussion given in the introduction, some specific points of relevance are as follows.

PDCCH may occupy the first 1, 2, 3 or 4 OFDM symbols in a subframe (4 is a special case for small system bandwidths). Consequently, the available bandwidth for PDCCH is rather limited. For convenience, a PDCCH message in accordance with a DCI format is referred to below simply as "a DCI format".

Existing DCI formats indicate data transmission in either DL or UL, but not both. However, some DCI formats for DL resource scheduling may also trigger some kind of transmission on the UL (e.g. a SRS).

A given PDCCH may be transmitted in any one of a number of given locations (which is a search space comprising a pre-determined subset of all the possible locations). The UE attempts blind decoding of the PDCCH in each location within the search space.

The UE is required to blind decode only a limited number of PDCCH candidates. A common search space is defined for all UEs. Also, UE-specific search spaces are defined based on particular identities (RNTIs).

As already mentioned, a given PDCCH may be transmitted using identities (RNTIs) such as:
C-RNTI: UE identity for normal operation
SPS C-RNTI: UE identity for activating/modifying/deactivating SPS transmission on an individual UE basis
TPC-PUCCH-RNTI: Group identity for Power control of PUCCH
TPC-PUSCH-RNTI: Group identity for Power control of PUSCH.

The RNTI is used to scramble the 16-bit CRC attached to the payload. This allows the UE to both identify whether the message has been decoded correctly, and confirm the RNTI value.

Each different type of message is conveyed using a different DCI format. Many PDCCH messages are intended to be received by only one UE, others are intended for more than one UE. In particular DCI formats 3 and 3A carry multiple power control commands, each power control command intended for a different UE.

A specific embodiment of the present invention (see below) is applied to semi-persistent scheduling, SPS. For SPS the following apply:
Use of SPS by a given UE may be configured independently in UL and DL.
The interval between subframes with an SPS resource is determined by RRC signalling.
The subset of subframes in which subsequent SPS resources occurs is determined according to the particular subframe in which the UE receives a PDCCH message with SPS C-RNTI. The same message also contains details of the transmission resources etc for PDSCH (in DL) or PUSCH (in UL).

Considering potential improvements to LTE (i.e. LTE-Advanced) to reduce the control channel overhead, possible approaches to solving the problem based on UE-specific signalling include:
(i) Reduction of the control channel message size. For DCI format sizes less than the CRC length, the CRC becomes ineffective as a mechanism for error detection. At least one new DCI format size would be needed, potentially increasing blind decoding load. Consequently, this approach is not preferred.
(ii) Control channel messages which carry multiple resource allocations. This approach has various ramifications as follows.
If the resources correspond to future subframes, this is supported by SPS.
If the resources correspond to different carriers, for small packets it would be more efficient to use only one carrier. That is, when using multiple carrier frequencies (so-called carrier aggregation), sending a small packet on each carrier would currently require transmission of one DCI format (or PDCCH message) per carrier. Therefore, in terms of control channel overhead, it would be more efficient to combine the several small packets into one larger packet, and send this on one carrier. This would require transmission of just one DCI format in total.
UL and DL resource allocations can be carried in the same message.

Following approach (ii), an embodiment of the present invention, as applied to LTE, involves transmitting multiple UE-specific resource allocations in a single DCI format containing information for multiple UEs. It is noted that for many applications the same set of parameter values or selection from a small set of different parameter values is sufficient, and this fact can be exploited to save bits.

The selection between sets of parameter values is indicated by one or more individual bits. Thus, in the present embodiment, sets of one or more bits, each set intended for a different UE, are transmitted in one PDCCH message, using a new DCI format. The sets of parameter values may, for example, be determined by higher layer (e.g. RRC) signalling, dynamically (e.g. via PDCCH) or fixed in the system specification.

The new DCI format could be distinguished from an existing DCI format, by having a different size (number of payload bits). However, in order to avoid increasing the number of blind decodes, the size of the new DCI format is the same as that of an existing DCI format. Preferably the size is the same as DCI formats 0/1A/3/3A, and is transmitted either in the common search space, or in another search space. For convenience, the new format is referred to below as "3B", though it will be understood that the particular label given is unimportant.

In terms of the LTE specification 3GPP 36.212, embodiments of the present invention involve the definition of a new DCI format, as in the following:—

Format 3B

DCI format 3B is used for the transmission of DCI bits.
The following information is transmitted by means of the DCI format 3B:
DCI bit number 1, DCI bit number 2, . . . , DCI bit number M where $M=L_{format0}$, and where $L_{format0}$ is equal to the payload size of format 0 before CRC attachment, including any padding bits appended to format 0. Parameters provided by higher layers determine the indices to the DCI bits, and the interpretation of those bits for a given UE.

However, it is advantageous to be able to distinguish the new DCI format, which could be done using a specific identity (RNTI). In terms of the LTE specification 36.213, embodiments of the present invention make use of a new RNTI such as the following:—

If a UE is configured by higher layers to decode PDCCHs with the CRC scrambled by the DCI-BIT-RNTI, the UE shall decode the PDCCH according to the combination defined in table 8.9.

TABLE 8-9

| PDCCH configured by DCI-BIT-RNTI | |
| --- | --- |
| DCI format | Search Space |
| DCI format 3B | Common |

Each possible value of a group of one of more DCI bits can indicate parameters equivalent to one of a set of pre-configured PDCCH messages (or partial PDCCH messages).

Additional parameters could be included, such as indication of a timing offset between the subframe in which the new DCI is received and the subframe in which the indicated parameters are to be applied.

A given DCI bit may used to signal to a single UE, or a group of UEs.

There are several advantages of this scheme. It allows the possibility of very low PDCCH overhead. There is almost no increase in blind decoding complexity if the new DCI format is the same size as DCI formats 0/1A, since this requires only an additional CRC check. There is the possibility of improved reliability compared with a UE specific DCI format (for many UEs), since the common PDCCH message can be transmitted with more energy without a significant cost in overhead. Additionally, there is the possibility of combining the functionality of both DCI formats 3 and 3A for both PUSCH and PUCCH power control.

The new scheme can provide similar features to SPS as currently defined in LTE but with more flexibility, allowing better support for variable packet sizes and variable intervals between packets. A specific use for the new scheme is to support retransmissions using SPS in the UL, where currently a first transmission requires no PDCCH, but a retransmission requires a full PDCCH.

The scheme as outlined above has less signalling flexibility compared with the existing DCI formats. However, if more flexibility is needed in a particular subframe, then one of the existing formats can be used instead, as is currently supported in LTE. As noted, there would be the very small additional computation of an additional CRC check.

First Embodiment

In a first embodiment based on LTE, the network operates using FDD and comprises one or more eNBs, each controlling at least one downlink cell, each downlink cell having a corresponding uplink cell. Each DL cell may serve one or more terminals (UEs) which may receive and decode signals transmitted in that cell. In order to schedule the appropriate use of transmission resources in time, frequency and spatial domains for transmission to and from the UEs, the eNBs send control channel messages (PDCCH) to the UEs.

As already mentioned, a PDCCH message typically indicates whether the data transmission will be in the uplink (using PUSCH) or downlink (using PDSCH), it also indicates the transmission resources, and other information such as transmission mode and data rate. The UE performs blind decoding for a number of possible PDCCH message types (DCI formats) over a defined search space on the downlink primary cell (Pcell). A given UE is configured by higher layer signalling (e.g. RRC signalling) to receive a DCI format (e.g. DCI format 3B) in the common search space. The CRC of DCI Format 3B is scrambled by an RNTI (e.g. DCI-BIT-RNTI). Parameters provided by higher layers (e.g. RRC) determine the indices to the DCI bits for the given UE, and the interpretation of those bits for the given UE.

In a preferred version of this first embodiment, the values of at least one of the DCI bits indicates a selection from a set of preconfigured DCI messages. Each member of the set of preconfigured DCI messages corresponds to set of values for each parameter of interest. As an example the set of parameters could correspond to those which could be transmitted using an existing DCI format. One DCI bit in the new format 3B would allow one of two different messages to be indicated. Two DCI bits would allow one of four different messages to be indicated, etc.

This would be suitable for applications where limited flexibility (e.g. in resource allocation, or data rate) is acceptable (e.g. where the same resource allocation is used frequently) in return for very low control channel overhead, such as for MTC or VoIP. SPS achieves this but is even less flexible, particularly in terms of fixed data rates and timing of resource allocation. For subframes where the restriction of using a preconfigured set of parameters in not acceptable, then an existing DCI format can be used instead.

Figure 6:
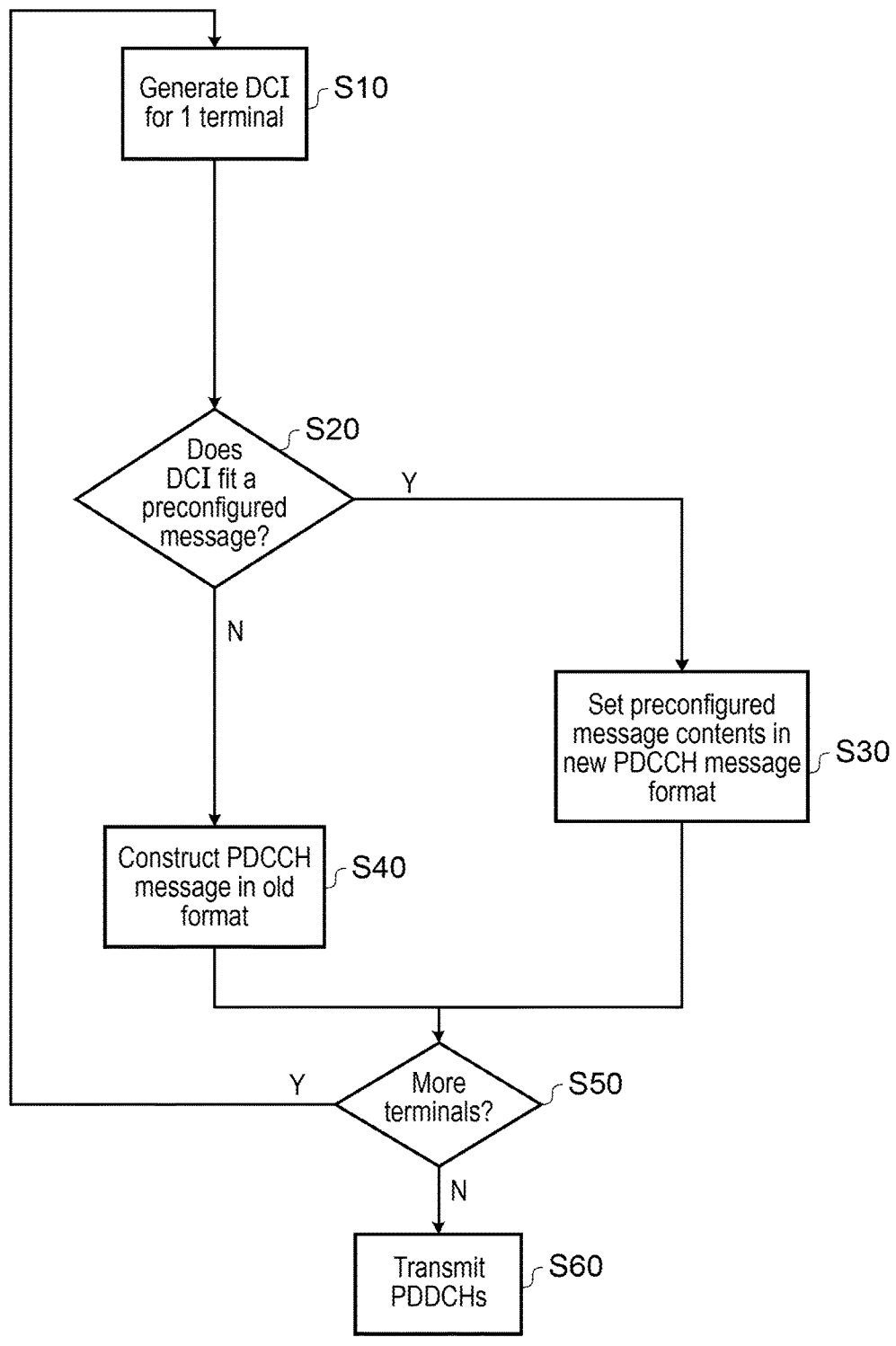
FIG. 6 is a flowchart illustrating steps in a method embodying the present invention.

FIG. 6 is a flowchart for illustrating steps in a method for constructing DCI in this case. Thus, the method begins (step S10) with an eNB (or higher level node, or suitably-capable RN) scheduling an allocation of resource for a UE either on DL or UL, producing some scheduling information (denoted DCI in the Figure for simplicity). Then it is checked (S20) whether the newly-generated scheduling information fits a preconfigured message, or in other words whether the parameter values it contains coincide with a predetermined set of parameter values. If so, it is suitable for use with the new format in accordance with the present invention and the PDCCH is accordingly constructed using the new format "3B" in step S30. This PDCCH message may be specific to a single terminal, or may be common to a group of terminals. The scheduling information may be for SPS (see below). If the scheduling information does not fit a preconfigured message, it is necessary to construct a specific PDCCH message for that terminal using one of the existing DCI formats in step S40. In either case, the next step (S50) is to check whether there are any more terminals which the eNB needs to schedule in the subframe being scheduled. If so then the process returns to the beginning; however, if not (in other words all terminals have been scheduled), the resultant PDCCH messages (for example, one or more messages in each of old and new DCI formats) is transmitted in step S60. The process will normally repeated for every subframe, assuming that at least some UEs require dynamic scheduling which is subject to change on a per-subframe basis. However, it is to be noted that the scheduling information need not apply to the next subframe. As mentioned below, one possible parameter is a time delay (e.g., number of subframes) before other scheduling information takes effect. Such a time delay may also be determined implicitly, for example a different delay value may be configured for each of several terminals.

As an example, for FDD at least one of the preconfigured messages indicated by format 3B contains values for the following UL grant, which would otherwise be sent using DCI format 0:—

Frequency hopping flag
Resource block assignment and hopping resource allocation
Modulation and coding scheme and redundancy version
New data indicator
TPC command for scheduled PUSCH
Cyclic shift for DM RS and OCC index
CSI request
SRS request
Multi-cluster flag In the above list, DM RS is the above-mentioned demodulation reference signal. The cyclic shift and OCC (orthogonal cover code) index characterise the DM RS. SRS refers to a Sounding Reference Signal used by the eNB to estimate the quality of the uplink channel. The multi-cluster flag is used to indicate non-contiguous (called "multi-cluster") resource allocation on the uplink. Other parameters are as mentioned previously.

Note that it will not be necessary in every case to indicate all the values corresponding to a DCI format. For example, TPC commands may not be required. Default values may be defined for values not included.

As a further example, for FDD at least one of the preconfigured messages indicated by format 3B contains values for the following DL assignment, which would otherwise be sent using DCI format 1A:—
  Localized/Distributed VRB assignment flag
  Resource block assignment
  Modulation and coding scheme
  HARQ process number
  New data indicator
  Redundancy version
  TPC command for PUCCH
  SRS request Here, the VRB assignment flag is used to indicate whether Virtual Resource Blocks assigned to a UE are contiguous ("Localized") or non-contiguous ("Distributed"). Redundancy version relates to HARQ and allows retransmission of a codeword multiple times until it is successfully received. The other parameters are as outlined already.

Note that additional information may be included, for example indication of resources to be used for PUCCH. Information not normally part of a DCI format may also be included e.g. ACK/NACK for data sent on PUSCH, time delay between reception of DCI format and validity of UL or DL assignment.

In a variation of this embodiment, DCI format 3B may simultaneously carry bits corresponding to more than one set of DCI e.g. both UL and DL assignments.

In a further variation of this embodiment, the set of preconfigured messages may include sets of values broadly corresponding to more than one DCI format. This can allow an indication of a selection of one set (or more, in the case of both UL and DL) from a plurality of sets of preconfigured parameters. As well as containing different values, different sets of parameters could correspond to contents of different DCI formats (not restricted to 0 and 1A).

In a further variation of this embodiment groups of one or more DCI bits in format 3B may simultaneously carry one or more of the following, e.g. according to RRC configuration:—
  DL assignment on PDSCH
  UL assignment on PUSCH
  1 bit TPC commands for PUCCH
  2 bit TPC commands for PUCCH
  1 bit TPC commands for PUSCH
  2 bit TPC commands for PUSCH
  ACK/NACK for a codeword sent on PUSCH
  ACK/NACK for a code block within a codeword sent on PUSCH
  SRS trigger
  CSI report trigger
  Activation/deactivation of SPS
  Activation/deactivation of DRX/DTX
  Activation/deactivation of carriers
  Status of DL data buffer at the eNB
  Indication of message type (i.e. contents of the parameter set);
  Indication to ignore message contents or otherwise; and
  Time delay before a parameter is applied.

Here, the item "Indication of message type" is used to allow the same set of bits to indicate different parameters. The "Indication to ignore message contents or otherwise" can be used in case there is no message or parameter value intended for the terminal expecting to decode the corresponding bits, in other words a "no action" flag.

As a further variation the new format 3B could be transmitted in an additional or alternative search space (e.g. a UE-specific search space).

Second Embodiment

A second embodiment is similar to the first embodiment except that a given DCI bit is used to convey information to more than one UE simultaneously. The interpretation of the information bit may be the same or different for different UEs, for example corresponding to different RRC configurations of UL and/or DL assignments. A group of UEs is defined by configuring them with the same value of DCI-BIT-RNTI.

In a preferred version of this second embodiment, format 3B is used to convey the same command to a number of UEs. For example:—
  Change of state (e.g. to idle mode or "off" state)
  Request to transmit data (e.g. one or more sensor measurements or meter readings)
  Change in application level data (e.g. change in electricity tariff, in the case of an electricity meter).

In this instance, an additional/alternative (or possibly extended) search space would be more appropriate. The advantage is that a larger search space makes it possible to transmit more PDCCH messages. Currently in LTE the common search space (for broadcasting PDCCH messages to multiple UEs) is rather restricted.

The acknowledgement of successful reception of such a command could be carried using preconfigured resources (e.g. on PUCCH or using PUSCH according to a previously configured UL grant). In order to avoid all UEs responding at the same time, different UEs would be configured to respond after different amounts of time delay.

Specific Embodiment—SPS

As a specific embodiment of the present invention, we now consider potential improvement to SPS operation in LTE (i.e. LTE-Advanced) to improve operational flexibility but with low control channel overhead.

The specific embodiment is intended to be applied to SPS, so that the indicated set of parameter values for a given UE is applied to the operation of SPS for that UE. For example this can be achieved by modification of the parameters applying to a single transmission scheduled according to SPS, or modification of the parameters to be applied subsequently.

In this case, the new Format 3B already outlined above is modified as follows:

If a UE is configured by higher layers to decode PDCCHs with the CRC scrambled by the SPSG C-RNTI, the UE shall decode the PDCCH according to the combination defined in table 8.9.

TABLE 8-9

| PDCCH configured by SPSG C-RNTI | |
| --- | --- |
| DCI format | Search Space |
| DCI format 3B | Common |

The SPSG C-RNTI is a new RNTI indicating a group of UEs configured for SPS operation. It is to be distinguished from SPS C-RNTI already defined in LTE for a single UE.

Use of this scheme for SPS allows much greater operational flexibility for SPS, compared with conventional SPS where a specific PDCCH message is required to modify the SPS configuration. The term "SPS" is therefore to be interpreted broadly as encompassing more flexible semi-persistent scheduling schemes in addition to the conventional SPS defined in LTE.

Whilst operational flexibility is improved in this embodiment, the signalling flexibility is reduced compared with use of the existing DCI format to modify SPS transmissions, since the UEs are addressed as a group. However if more flexibility is needed in a particular subframe, then one of existing formats can be used instead, as is currently supported in LTE. As noted previously, if the new DCI format is the same size as one of the existing formats, there is only the very small additional computation of an additional CRC check to test for the presence of SPSG C-RNTI.

The conventional SPS C-RNTI can continue to be used. That is, the UE may be configured to receive DCI formats with CRC scrambled by SPS C-RNTI, which may activate, modify or deactivate SPS operation on an individual UE basis. In the case of SPS, the period between SPS transmissions is configured by RRC signalling independently for UL and DL.

In a first form of this embodiment, a UE which is configured for SPS operation (and receive DCI formats with CRC scrambled by SPS C-RNTI) may also be configured to receive a new DCI format with CRC scrambled by SPSG C-RNTI. Assuming that SPS operation is activated (e.g. by reception of an appropriate PDCCH message), the value of a particular (first) information bit in the new DCI format indicates whether or not the UE should expect a PDSCH transmission in the DL (according to predetermined SPS parameters) in the same subframe. The predetermined SPS parameters may be signalled by RRC or in a PDCCH message. Similarly, a different (second) information bit may indicate whether the UE should transmit PUSCH in the UL. The particular information bits carrying these indications is predetermined (e.g. configured by RRC signalling). That is, each UE knows where in the format to find the (or each) set of bits intended for that UE.

In other words, the first form allows a PDCCH message to be constructed which addresses a group of UEs, but which causes SPS to be activated or deactivated on a per-subframe basis for each terminal separately, and independently for UL and DL.

In a variation of the first form, the reception of a DCI format with SPSG C-RNTI in a particular subframe modifies SPS operation so that the periodic transmission and/or reception according to the SPS parameters continue from that subframe. In other words, reception of the DCI format overrides any existing parameter values set up for SPS with values contained in the DCO format (either explicitly or signified as a selection among sets of predetermined values).

In a second form, which is otherwise like the first form of the SPS embodiment, when the UE receives a DCI format with SPSG C-RNTI, the values of a further set of information bits indicates the subframe in which SPS transmission and/or reception should take place. This could be by means of the information bits indicating an offset relative to the subframe in which the DCI format is received. Different UEs may be configured with different offsets or sets of offsets.

In a third form, which is otherwise like the first form, when the UE receives a DCI format with SPSG C-RNTI, the value of a particular information bit activates/deactivates SPS operation. Again, this may be done in common for the group of UEs, or individually for each UE in the group addressed by the SPSG C-RNTI.

In a fourth form, which is otherwise like the first form, when the UE receives a DCI format with SPSG C-RNTI, the values of a particular set of information bit indicates a selection from one among a pre-determined set of SPS transmission and/or reception parameter values which are to be used by the UE. The pre-determined set of SPS parameters may be signalled by RRC. Thus, unlike the first form which essentially only activates/deactivates SPS, this form of the embodiment additionally configures values of a set of parameters for SPS.

In a fifth form of the SPS embodiment, which is otherwise like the first form, when the UE receives a DCI format with SPSG C-RNTI, the values of a particular set of information bits indicates one of a pre-determined set of carrier frequencies which are to be used for SPS transmission and/or reception by the UE. Once again this indication may either be on an individual terminal basis, or for the group collectively.

Various techniques may be used in this embodiment to limit the amount of blind decoding required at the UE side.

In a sixth form, which is otherwise like the first form, each UE in the group is configured to expect to receive a DCI format with SPSG C-RNTI only within a subset of the available subframes. For example, transmission of DCI format with SPSG C-RNTI may be restricted to subframes corresponding to a period and an offset, which may be configured by RRC signalling. This restriction may limit the number of additional blind decodes. In addition a higher number of active UEs can be supported.

As a variation, in subframes where the UE expects to receive a DCI format with SPSG C-RNTI, it does not also expect to receive a DCI format having a different size with C-RNTI. As a further variation, the UE only expects to receive a DCI format with SPSG C-RNTI in subframes configured for SPS transmission and/or reception.

In seventh form, which is otherwise like the first form, the UE only expects to receive a DCI format with SPSG C-RNTI, in subframes with a pre-determined delay following an SPS transmission in the UL. This supports the scheduling of retransmissions.

The above forms of the specific embodiment may also be modified to transmit other information, such as power control commands, using the new DCI format. In other words, the specific embodiment, whilst primarily intended to configure SPS-type operation at terminals, may be used to convey additional control information not necessarily related to SPS.

As an example, SPS parameters for which parameter values may be defined in the above-mentioned set of SPS transmission and reception parameters (for example in the fourth form already mentioned) could include:
    Frequency hopping flag
    Resource block assignment and hopping resource allocation
    Modulation and coding scheme and redundancy version
    Cyclic shift for DM RS and OCC index
    TPC (transmit power control) commands
    CSI request
    SRS request
    Multi-cluster flag Relay Embodiment A further embodiment is similar to the above embodiments, but the control channel transmission is from an eNB to a relay node (RN). This uses R-PDCCH as mentioned above and described in 3GPP TS36.216, instead of PDCCH, for the DL control channel. The features of the first and/or second embodiments may be applied.

Of particular interest would be the possibility of using DCI format 3B to transmit ACK/NACK from the eNB to one or more RNs for data transmitted in the uplink from RNs to eNB using PUSCH, since such ACK/NACK transmission is not currently supported. Normally, for UL transmissions on PUSCH from UE to eNB the ACK/NACK indicating correct reception of PUSCH (or otherwise) is carried by the PHICH. If the UE receives a NACK it would perform a retransmission using the same resources as the first transmission (without needing a grant on PDCCH). Alternatively, different retransmission resources can be granted explicitly using PDCCH. However, use of PHICH is not defined for use with PUSCH transmitted from RN to eNB (and it would not be easy to do so). In this case NACK would be implied if PDCCH indicates resources for a retransmission (otherwise ACK is assumed). So PDCCH is always sent. However, it could be advantageous (in reducing control channel overhead) to support explicit ACK/NACK.

Note that most scenarios considered in 3GPP discussions assume that there would be only a few relay nodes per donor cell. However, future scenarios could include large number of devices per cell using the R-PDCCH e.g. for MTC.

Thus, to summarise, an embodiment of the present invention may provide a scheme for transmission of control channel information in a compact form. The main advantages are as follows:—

Possibility of very low PDCCH overhead, suitable for efficient transmission of very low data payloads.

Almost no increase in blind decoding complexity if the new DCI format is the same size as DCI formats 0/1A, since this would require only an additional CRC check.

Possibility of improved reliability than UE specific DCI format (for many UEs), since the common PDCCH message can be transmitted with more energy without a significant cost in overhead. That is, PDCCH messages can be made more reliable by adding additional redundancy (which may be by repetition of bits). In LTE the total message size can then be increased by a factor of 2, 4 or 8. This factor is referred to as the aggregation level.

Possibility of combining the functionality of both DCI formats 3 and 3A for both PUSCH and PUCCH power control within a single instance of PDCCH transmission.

Better support for variable packet sizes and variable intervals between packets than currently defined SPS.

A specific use for the invention is for SPS, including to support retransmissions using SPS in the UL, where currently a first transmission requires no PDCCH, but a retransmission requires a full PDCCH. Currently, for the special case of SPS (Semi-Persistent Scheduling), transmission of NACK (on PHICH) to request a retransmission by the UE is not supported. A retransmission in the UL requires an explicit resource grant.

Various modifications are possible within the scope of the present invention.

The new format described with respect to an embodiment of the present invention was referred to as "3B" for convenience, but the designation used is not essential. More than one distinct format may be defined using the principle of the present invention. However, it is preferable for any new format defined in accordance with the present invention to have the same size (in bits) as formats already defined in LTE, so as to reduce the additional blind decoding otherwise required.

The new format has been described in relation to PDCCH, but it is to be understood that this includes R-PDCCH as well as any other physical DL control channels whether or not denoted by PDCCH.

Any of the embodiments and variations mentioned above may be combined in the same system. Whilst the above description has been made with respect to LTE and LTE-A, the present invention may have application to other kinds of wireless communication system also. Accordingly, references in the claims to "user equipment" are intended to cover any kind of subscriber station, MTC device and the like and are not restricted to the UE of LTE.

Although the new format(s) in accordance with the present invention can be applied to more than one UE simultaneously, this is not essential. The new format may advantageously be applied even to a single UE where the use of preconfigured messages allows more information to be conveyed within the available number of bits. Thus, for example, both UL and DL allocations for the same UE may be indicated within the same PDCCH message.

In this case, it may be preferable to employ the UE-specific search space (as for other DCI formats intended for a single UE), rather than the common search space.

The third embodiment relating to R-PDCCH may find application in future to transmission from eNB to UEs (i.e. without involvement of RNs), since such a use of R-PDCCH is under discussion.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be understood that various changes and/or modifications may be made to the particular embodiments just described without departing from the scope of the claims.

To summarise, embodiments of the present invention provide a scheme for transmission of control channel information in a compact form. A specific embodiment is intended to support SPS (Semi-Persistent Scheduling). As applied to LTE, the main feature is to indicate a preconfigured UE-specific resource allocation in a Downlink Control Information (DCI) format containing information for multiple UEs in the same PDCCH.

In other words, by means of the present invention, the same PDCCH may be used to address a group of terminals, but different parts of the DCI format may be intended for different terminals within the group. This does not exclude one part (set of bits) being used to send a common control message to all terminals in the group.

In order to avoid increasing the number of blind decodes, the DCI format size may be the same as an existing DCI format. Preferably, the size is the same as DCI formats 0/1A/3/3A, and is transmitted in the common search apace.

The number of required bits per UE is minimised by signalling only one of a limited set of DCI messages per UE.

Applied to SPS, the main advantages are as follows:—

Better support for variable packet sizes and variable intervals between packets than currently defined SPS Possibility of very low PDCCH overhead, suitable for efficient transmission of very low data payloads (eg: for Machine to Machine communication and sensor communication traffic).

Almost no increase in blind decoding complexity if the new DCI format is the same size as DCI formats 0/1A, since this would require only an additional CRC check.

Possibility of improved reliability than UE specific DCI format (for many UEs), since the common PDCCH message can be transmitted with more energy without a significant cost in overhead.

In particular the present invention can be used to improve support retransmissions using SPS in the UL, where currently a first transmission requires no PDCCH, but a retransmission requires a full PDCCH.

INDUSTRIAL APPLICABILITY

Embodiments of the present invention allow transmission of UE-specific resource allocations in a Downlink Control Information (DCI) format containing information for multiple UEs in the same PDCCH. Currently in LTE, a single control channel (PDCCH) is transmitted to the UE for any UL or DL resource allocation, except for semi-persistent scheduling (SPS). The invention modifies the control channel operation, providing an additional means, in particular a new combinatory set of preconfigured messages, for efficiently transmitting control information for those instances where full flexibility is not required. In order to avoid increasing the number of blind decodes, the size of the new DCI format (3B) is the same as an existing DCI format, preferably same as the size of DCI formats 0/1A/3/3A, and is transmitted in the common search space. The number of required bits is reduced by signalling only one of a limited set of DCI messages per UE. Thus the PDCCH is effectively able to support an increased number of UEs.

What is claimed is:

1. A terminal apparatus comprising:
processor circuitry and a transceiver, which terminal apparatus performs transmission and/or reception in units of subframes, and receives a control signal arranged in accordance with a predefined format having a predetermined size in bits and comprising one or more sets of bits each containing one or more bits from a base station;
wherein within the format, a first set of bits is intended for one or more terminal apparatus and a second set of bits distinct from the first set of bits is intended for other terminal apparatus; and
wherein transmission and/or reception by the terminal apparatus in a subsequent subframe is determined by the said set of bits of the control signal.

2. The terminal apparatus according to claim 1, wherein the transmission and/or reception by the terminal apparatus in the subsequent subframe depends on timing of reception of the control signal.

3. The terminal apparatus according to claim 1, wherein the transmission and/or reception by the terminal apparatus in the subsequent subframe depends on value(s) of the first set of bits.

4. The terminal apparatus according to claim 1, wherein the sets of bits include sets of bits representing values of one or more parameters.

5. The terminal apparatus according to claim 1, wherein the sets of bits include sets of bits representing a selection among predetermined sets of parameter values.

6. The terminal apparatus according to claim 5, wherein the parameter values, or predetermined sets of parameter values, include parameter values for scheduling transmission and/or reception of the terminal apparatus.

7. The terminal apparatus according to claim 1, wherein the first set of bits includes at least one bit indicating any one of:
whether transmission and/or reception is to be performed in a current subframe either on a downlink and/or on an uplink;
whether transmission and/or reception is to be performed in subsequent subframes either on a downlink and/or on an uplink;
whether transmission and/or reception is to be performed in a defined subframe which is a defined number of subframes from the current subframe;
whether semi-persistent scheduling, SPS operation is to be activated or deactivated;
a selection among predetermined sets of parameter values for scheduling; and
a selection among a predetermined set of carrier frequencies for scheduling.

8. A terminal apparatus for use in a communication system, the communication system comprising:
the terminal apparatus equipped with a processor and transceiver and configured to receive a control signal from a base station in a current subframe and decode the control signal, the control signal arranged in accordance with a predefined format having a predetermined size in bits and comprising one or more sets of bits each containing one or more bits;
wherein within the format, a first set of bits is intended for one or more terminal apparatus and a second set of bits distinct from the first set of bits is intended for other terminal apparatus; and
wherein a transmission and/or reception by the one or the other terminal apparatus in a subsequent subframe is determined by the said set of bits of the control signal.

* * * * *